United States Patent
Boltz et al.

(10) Patent No.: US 9,408,115 B2
(45) Date of Patent: Aug. 2, 2016

(54) BASE STATION CONTROLLER SELECTION FOR A ROAMING RADIO BASE STATION AND METHOD OF OPERATING THE SAME

(71) Applicant: TELEFONAKTIEBOLAGET L M ERICSSON (PUBL), Stockholm (SE)

(72) Inventors: David Boltz, Garland, TX (US); Richard Swardh, Frisco, TX (US); Bo Sundstedt, McKinney, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 512 days.

(21) Appl. No.: 14/022,538

(22) Filed: Sep. 10, 2013

(65) Prior Publication Data

US 2014/0287761 A1 Sep. 25, 2014

Related U.S. Application Data

(60) Provisional application No. 61/803,930, filed on Mar. 21, 2013.

(51) Int. Cl.
- *H04W 36/00* (2009.01)
- *H04W 36/10* (2009.01)
- *H04W 36/30* (2009.01)
- *H04W 36/38* (2009.01)
- *H04W 24/02* (2009.01)

(52) U.S. Cl.
CPC .......... *H04W 36/0055* (2013.01); *H04W 36/10* (2013.01); *H04W 24/02* (2013.01); *H04W 36/30* (2013.01); *H04W 36/38* (2013.01)

(58) Field of Classification Search
CPC ... H04W 84/005; H04W 88/08; H04W 36/30; H04W 48/20; H04W 36/08; H04W 36/10; H04W 36/14; H04W 36/38; H04W 36/0055; H04W 88/12; H04W 92/045
USPC ................ 455/11.1, 13.1, 436, 438, 439, 453
See application file for complete search history.

(56) References Cited

U.S. PATENT DOCUMENTS

| | | | |
|---|---|---|---|
| 2007/0105527 A1* | 5/2007 | Nylander | H04L 29/12066 455/403 |
| 2010/0131628 A1 | 5/2010 | Yu et al. | |
| 2011/0136488 A1* | 6/2011 | Kuvvali | H04W 36/08 455/436 |

FOREIGN PATENT DOCUMENTS

| | | |
|---|---|---|
| CN | 101179762 B | 8/2010 |
| WO | WO 99/12227 A2 | 3/1999 |
| WO | WO 2012/042297 A1 | 4/2012 |
| WO | WO 2013/046078 A1 | 4/2013 |

* cited by examiner

*Primary Examiner* — Olumide T Ajibade Akonai
(74) *Attorney, Agent, or Firm* — Roger S. Burleigh

(57) ABSTRACT

A master monitor/control ("M/C") unit selects a base station controller ("BSC") to serve a mobile radio base station ("RBS"). In one embodiment, the master M/C unit is configured to monitor and assess performance parameters of a communications link between the mobile RBS and a serving BSC and alternative communications links between the mobile RBS and a plurality of other BSCs. The master M/C unit is also configured to determine if the performance parameter of an alternative communications link between the mobile RBS and one of the plurality of other BSCs is better than the performance parameter of the communications link between the mobile RBS and the serving BSC, and select the one of the plurality of other BSCs as an alternative BSC accordingly. The master M/C unit is also configured to provide a new configuration for the mobile RBS and the alternative BSC to enable the alternative communications link therebetween.

26 Claims, 7 Drawing Sheets

BASE STATION CONTROLLER SELECTION FOR A ROAMING RADIO BASE STATION AND METHOD OF OPERATING THE SAME

CROSS-REFERENCE TO RELATED APPLICATIONS

This application claims the benefit of U.S. Provisional Application No. 61/803,930, entitled "BSC Selection for Roaming RBS" filed on Mar. 21, 2013, which is incorporated herein by reference.

TECHNICAL FIELD

The present invention is directed, in general, to communication systems and, more particularly, to a system and method for associating a base station controller with a radio base station.

BACKGROUND

Transport vessels, cruise liners, and passenger aircraft communicate to land-based systems via satellite links. To obtain near global coverage, multiple satellites covering multiple regions are required. Global System for Mobile Communications ("GSM"), Wideband Code Division Multiple Access ("WCDMA"), Long Term Evolution ("LTE") and other cellular technologies are being deployed on the mobile transportation "vehicles" to provide voice, data and machine-to-machine ("M2M") communications. A mobile radio base station ("RBS") can communicate with a land-based base station controller ("BSC") using a satellite link as backhaul transport.

Today's cellular technologies are designed based upon a radio base station in a non-mobile, fixed location connected to a single base simian controller. The RBS and BSC are configured in a was that allows communication therebetween. With the advent of providing cellular services on moving "vehicles" (e.g., ships and planes), the RBSs become mobile and can be located anywhere on the globe. The RBS, however, communicate (via satellite and terrestrial backbone) to a single BSC which may be located on the other side of the globe. To operate efficiently, the communications link between the RBS and the BSC should fulfill specific performance criteria. This can, many times, not be achieved when the RBS and BSC are located on opposite sides of the globe.

Despite continued efforts, these limitations have now become substantial hindrances for efficient global deployment of mobile radio access technology. Accordingly, what is needed in the art is an approach that overcomes the deficiencies in the present mobile radio access technologies and systems.

SUMMARY OF THE INVENTION

These and other problems are generally solved or circumvented, and technical advantages are generally achieved, by advantageous embodiments of the present invention, a system and method fir associating a base station controller ("BSC") a radio base station ("RBS") including a master monitor/control ("M/C") unit for selecting a BSC to serve a mobile RBS. The mobile RBS is movable within and among a plurality of geographic regions served by a corresponding plurality of BSCs. In one embodiment, the master M/C unit is configured to monitor and assess a performance parameter of a communications link between the mobile RBS and a serving BSC, and monitor and assess a performance parameter of alternative communications links between the mobile RBS and a plurality of other BSCs. The master M/C unit is also configured to determine if the performance parameter of an alternative communications link between the mobile RBS and one of the plurality of other BSCs is better than the performance parameter of the communications link between the mobile RBS and the serving BSC. The master M/C unit is also configured to select the one of the plurality of other BSCs as an alternative BSC if the performance parameter of the alternative communications link with the mobile RBS is better than the performance parameter of the communications link between the mobile RBS and the serving BSC. The master M/C unit is also configured to provide a new configuration for the mobile RBS and the alternative BSC to enable the alternative communications link therebetween.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with association of a base station controller with a radio base station.

A process for a centralized master M/C unit to select a base station controller to serve a radio base station, particularly a mobile radio base station, will be described with respect to exemplary embodiments in a specific context, namely, a system and method that selects a base station controller to serve a particular radio base station by a master M/C unit in, for instance, a radio communication network operable with a Third Generation Partnership Project ("3GPP") radio access network. While the principles will be described in the environment of a cellular communication network, any environment that may benefit from such a system and method that enables selection of a base station controller to serve a radio base station is well within the broad scope of the present disclosure. As cellular systems are designed today, mobile subscribers (user equipment) can roam with their handsets from fixed RBS to fixed RBS. As introduced herein, mobile RBSs are allowed to roam from one BSC to another BSC and use one or more end-to-end performance criteria to select a preferred BSC.

Figure 1:
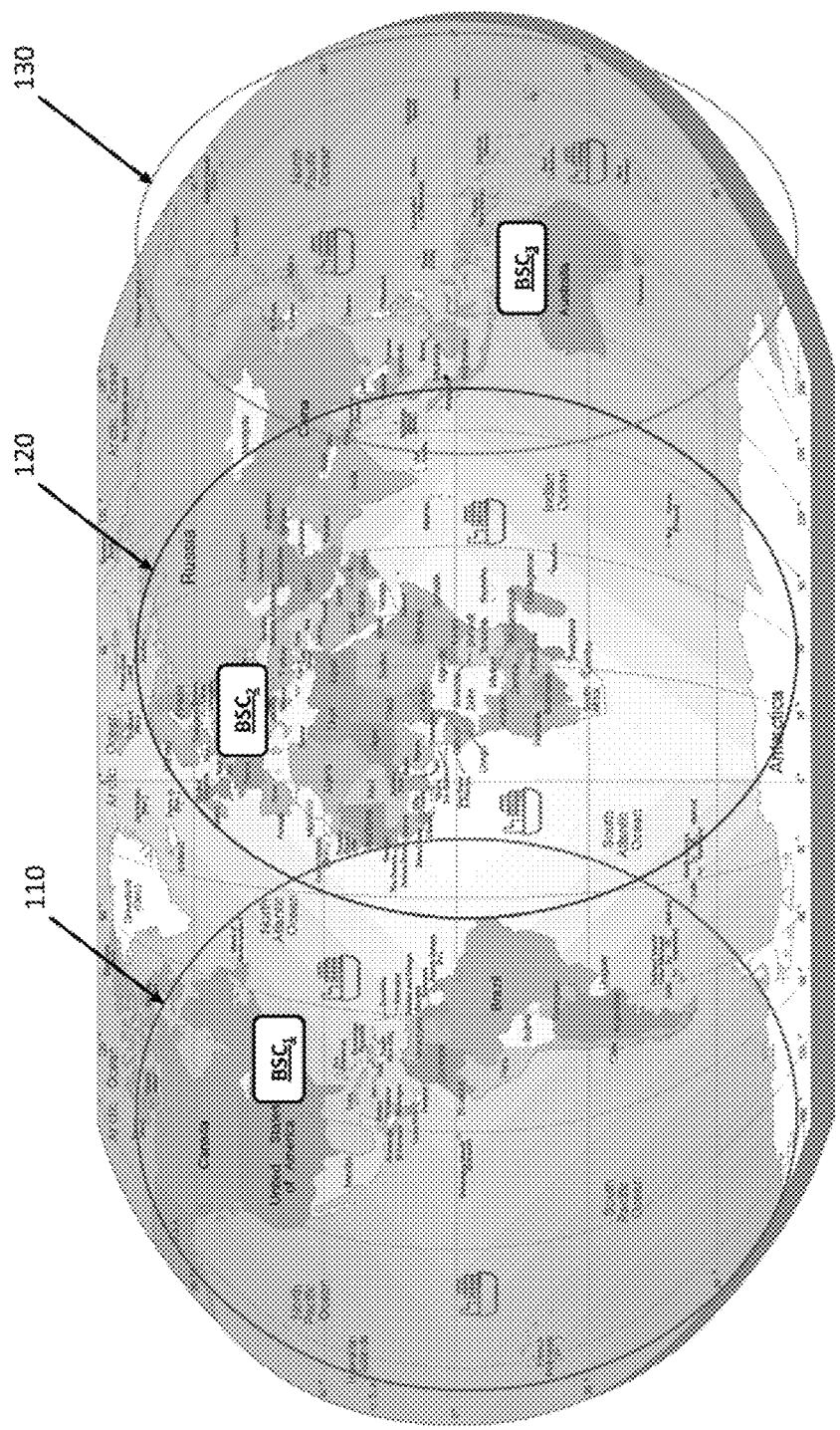
FIG. 1 illustrates a diagram showing an exemplary global view of base station controllers operable respectively in service regions.

Turning now to FIG. 1, illustrated is a diagram showing an exemplary global view of base station controllers $BSC_1$, $BSC_2$, and $BSC_3$ operable respectively in service regions 110, 120, and 130. Each base station controller is generally assigned to serve radio base stations within its respective service region. Radio base stations are generally located in a fixed position and are operable with a processor, memory and a transceiver to provide two-way communication with mobile user equipment located within its served cellular area. However, radio base stations can also be located on-board movable vessels such as ships and airplanes. RBSs that are on-board movable vessels that travel within a particular service region are generally serviced by the base station controller located in that particular service region.

As a vessel sails between service regions, however, the on-board RBS will necessarily communicate with its base station controller over a long distance, often with many and changing communication hops. Associated path delays and communication uncertainties introduced by long-distance and variable communication paths reduce the effectiveness and efficiency with which a base station controller can control a particular radio base station. It is also noted that an RBS on-board a vessel that is located in in one service region may be better served by a different base station controller due to factors such as load balancing, backbone performance, BSC outage, etc. As introduced herein, a master M/C unit that selects a base station controller to serve a radio base station, particularly a mobile radio base station, provides improved communication network performance by reducing communication path delays, balancing network loads, and accommodating a base station controller outage, among other possible network performance indicators.

Figure 2:
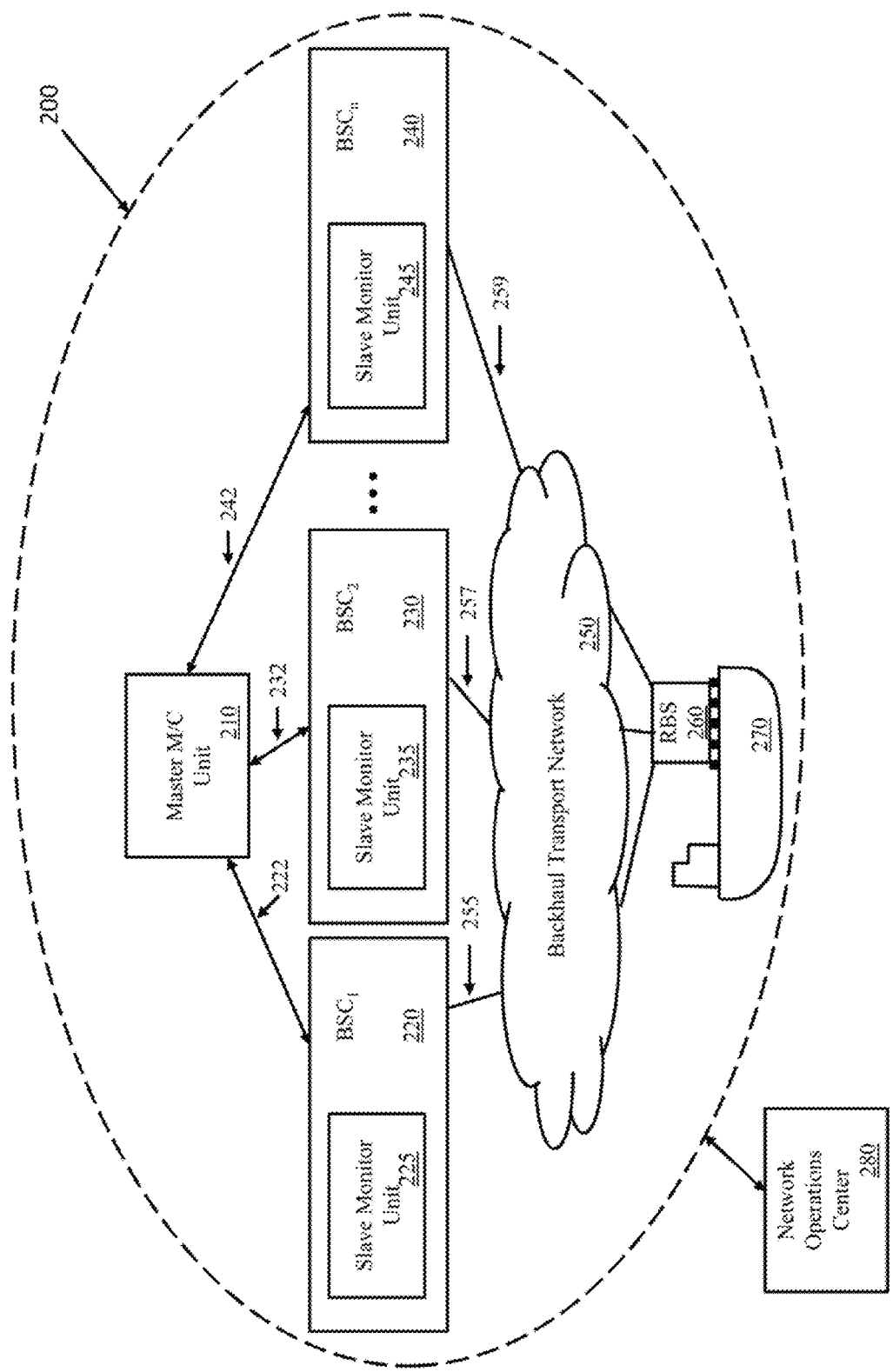
FIGS. 2 and 3 illustrate system level diagrams of embodiments of communication systems.

Turning now to FIG. 2, illustrated is a system level diagram of an embodiment of a communication system. The communication system includes a radio base station 260 that can be located on-board a movable vessel (e.g., a ship, plane or train) 270 and a master minor/control unit 210 that communicates with base station controllers 220, 230, 240 that can communicate with the radio base station 260. The base station controllers 220, 230, 240 are formed with respective slave monitoring units 225, 235, 245. The base station controllers 220, 230, 240 communicate with the master monitor/control unit 210 in global mobile network 200 over respective communication paths 222, 232, 242. In a typical network arrangement, one or more radio base stations are served by a single base station controller.

The communication elements illustrated in FIG. 2 also communicate with a network operations center 280 that provides monitoring and alarm-handling functions and relevant operational monitoring elements. The vessel 270 supports the on-board radio base station 260 that communicates wirelessly over an Abis (GSM) interface with backhaul transport network 250 that includes Satcom and terrestrial components. The backhaul transport network 250 communicates with the base station controllers 220, 230, 240. Communication links 255, 257, 259 represent paths (or portions thereon between the radio base station 260 and the base station controllers 220, 230, 240, respectively.

Figure 3:
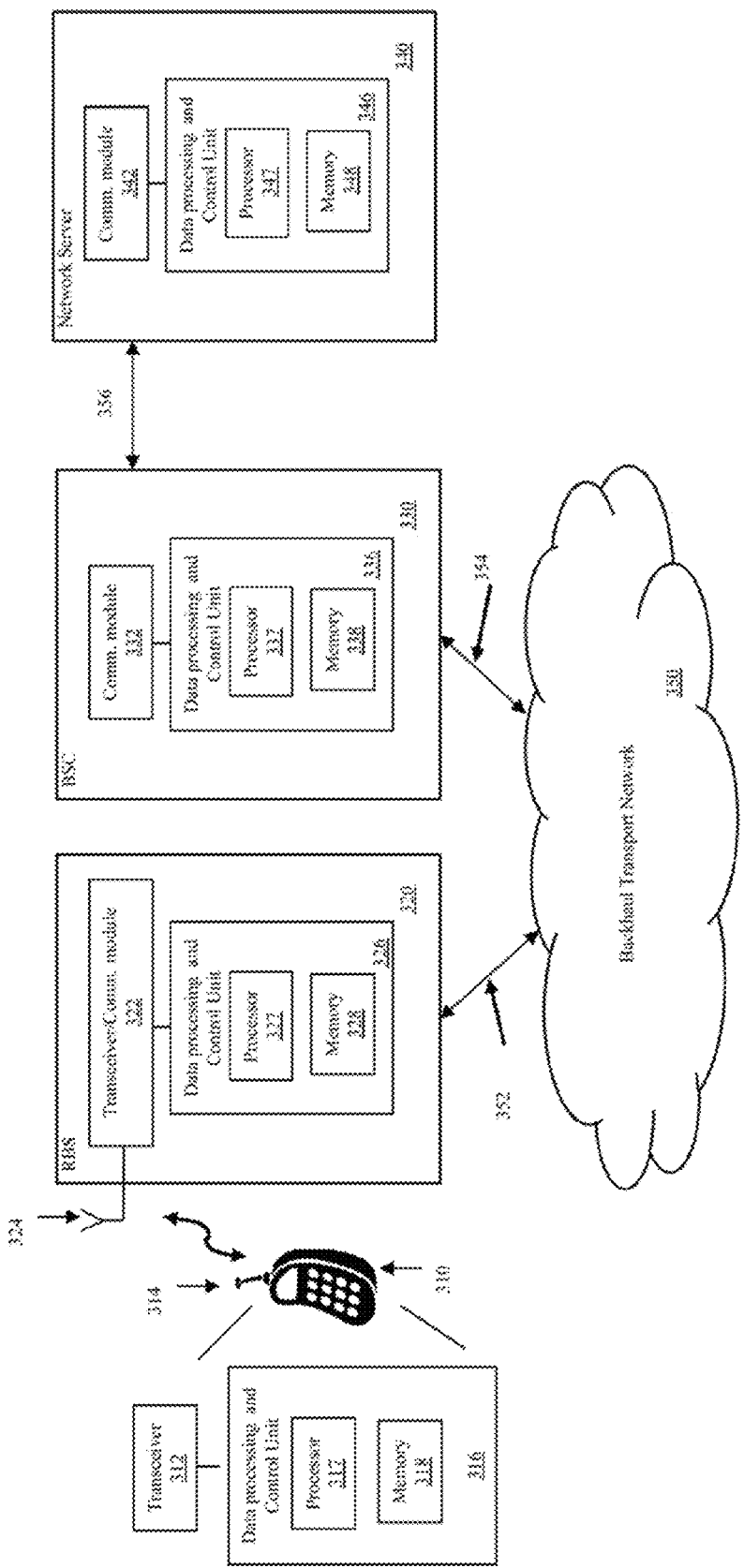

Turning now to FIG. 3, illustrated is a system level diagram of an embodiment of a communication system including a master M/C unit to select a base station controller to serve a radio base station. The communication system ma form a portion of a cellular radio access network and includes a user equipment 310 communicating wirelessly and bidirectionally with a RBS 320 coupled over the backhaul transport network 350 over communication paths 352, 354 to a BSC 330. The BSC 330 is coupled, in turn, to a network server (e.g., a master M/C unit) 340 in a 3GPP radio access network over communication path 356 that may include a communication path through the backhaul transport network 350. While the network server (e.g., the master M/C unit) 340 is illustrated communicating with a single RBS 320, it should be understood that the master M/C unit 340 communicates with a plurality of RBSs. Additionally, while the RBS 320 is illustrated communicating with a single user equipment 310, it should be understood that the RBS 320 communicates with a plurality of user equipment.

The user equipment. 310 is formed with a transceiver 312 coupled to an antenna 314. Of course, multiple antennas may be employed to advantage. The user equipment 310 includes a data processing and control unit 316 formed with a processor 317 coupled to a memory 318. Of course, the user equipment 310 includes other elements such as a keypad, a display, interface, devices, etc. The user equipment 310 is generally a self-contained wireless communication device intended to be carried by an end user (e.g., subscriber stations, terminals, mobile stations, machines, or the like).

The RBS 320 is formed with a transceiver/communication module 322 coupled to an antenna 324. Of course, multiple antennas may be employed to advantage. Also, the transceiver/communication module 322 is configured for wireless and wired communication. The RBS 320 may provide point-to-point and/or point-to-multipoint communication services. The RBS 320 includes a data processing and control unit 326 formed with a processor 327 coupled to a memory 328. Of course, the RBS 320 includes other elements such as interface devices, etc.

The RBS 320 may host functions such as radio resource management. For instance, the RBS 320 may perform functions such as internet protocol ("IP") header compression and encryption of user data streams, ciphering of user data streams, radio bearer control, radio admission control, connection mobility control, dynamic allocation of communication resources to the user equipment 310 in both the uplink and the downlink, and measurement and reporting configuration for mobility and scheduling.

The RBS 320 is operable with a 3GPP radio access coupled to a core network. The processor 327 in accordance with the memory 328 of the RBS 320 is configured to communicate with a user equipment over a radio interface. The radio interface comprises radio access technology data including a basis service set ("BSS") load indication, security information, quality of experience information, backhaul network bandwidth and loading and average throughput. The processor 327 in accordance with the memory 328 of the RBS 320 is also configured to provide performance parameters such as transport round trip time between the RBS 320 and the BSC 330, IP packet delay variance between the RBS 320 and the BSC 330, IP packet loss between the RBS 320 and the BSC 330, current load of the BSC 330, transport rowing costs between the RBS 320 and the BSC 330, and a load on the backhaul transport network 350.

The BSC 330 and the network server 340 are formed with communication modules 332, 342, respectively. The BSC 330 and the network server 340 also include data processing and control units 336, 346, respectively, formed with processors 337, 347, respectively, coupled to corresponding memories 338, 348. Of course, the BSC 330 and network server 340 include other elements such as interface devices, etc. The BSC 330 generally provides access to a telecommunication network such as a public service telecommunications network ("PSTN"). Access may be provided using fiber optic, coaxial, twisted pair, microwave communications, or similar link coupled to an appropriate link-terminating element. The network server 340 can be hosted, without limitation, by a service provider that provides cloud computing over the World Wide Web and may be external to the communication systems of the service provider.

The data processing and control units identified above provide digital processing functions for controlling various operations required by the respective unit in which it operates, such as radio and data processing operations to conduct bidirectional communications between RBSs, BSCs and access points, and a respective user equipment. The processors in the data processing and control units are each coupled to memory that stores programs and data of a temporary or more permanent nature.

The processors in the data processing and control units, which may be implemented with one or a plurality of processing devices, performs functions associated with its operation including, without limitation, pre-coding of antenna gain/phase parameters, encoding and decoding of individual bits forming a communication message, formatting of information and overall control of a respective communication element. Exemplary functions related to management of communication resources include, without limitation, hardware installation, traffic management, performance data analysis, configuration management, security, billing and the like. The processors in the data processing and control units may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories in the data processing and control units may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication element to perform its intended tasks. Of course, the memories may form a data buffer for data transmitted to and from the same. In the case of the user equipment, the memories may store applications (e.g., virus scan, browser, and games) for use by the same. Exemplary embodiments of the system, subsystems, and modules as described herein may be implemented, at least in part, by computer software executable by processors of the data processing and control units, or by hardware, or by combinations thereof.

The transceivers modulate information onto a carrier waveform for transmission by the respective communication element via the respective antenna(s) to another communication element. The respective transceiver demodulates information received via the antenna(s) for further processing by other communication elements. The transceiver is capable of supporting duplex operation for the respective communication element. The communication modules further facilitate the bidirectional transfer of information between communication elements.

The user equipment 310 is operable with a 3GPP radio access network, and in some environments a Wi-Fi radio access network coupled to a core network. The processor 317 in accordance with the memory 318 of the user equipment 310 is configured to communicate with the RBS 320 employing the transceiver/communication module 322 over a wireless interface. The processor 317 in accordance with the memory 318 of the user equipment 310 is also configured to perform other actions or functions as needed in the communication system.

Figure 4:
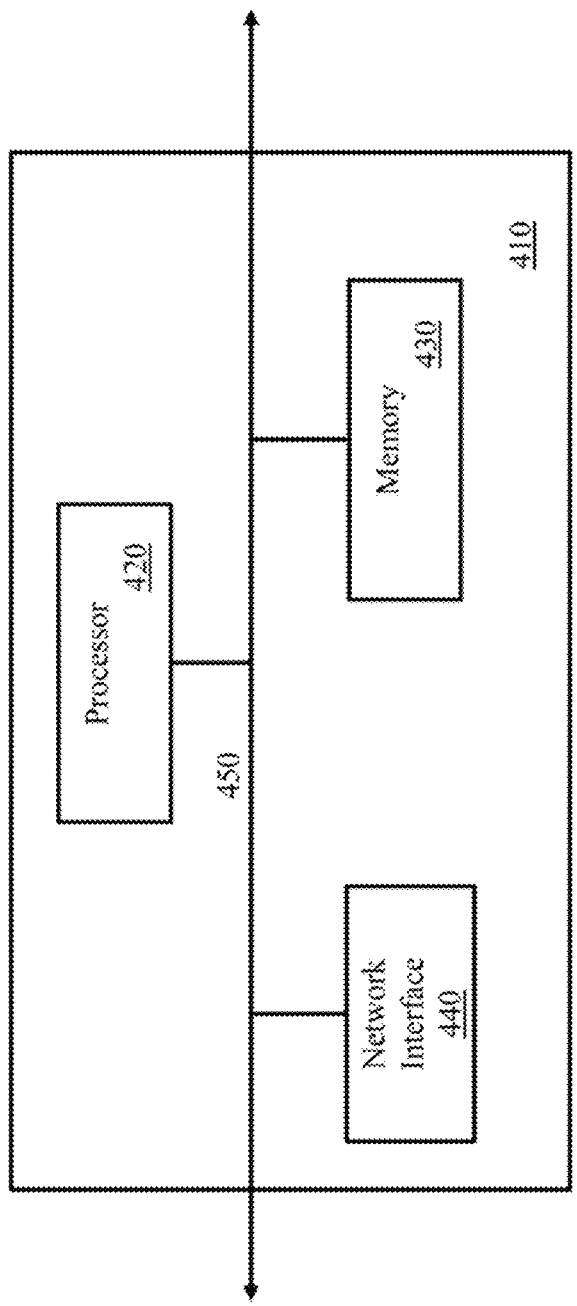
FIG. 4 illustrates a block diagram of an embodiment of a communication element.

Turning now to FIG. 4, illustrated is a block diagram of an embodiment of a communication element. The communication element or node 410 (e.g., a mobile RBS, BSC, master M/C unit, etc.) includes at least one processor 420 and a memory 430 that is coupled to a network interface 440 via an interconnect 450. The memory 430 can be implemented by a hard disk drive, flash memory, or read-only memory and stores computer readable instructions. The processor 420 executes the computer-readable instructions and implements the functionality described above. The network interface 440 enables the communication element 410 to communicate with other communication elements within the network such as by using a transceiver for wireless communication or other transmitting and receiving elements for wired or fiber-optic communication. Alternative embodiments of the present invention may include additional components responsible for providing additional functionality, including any functionality described herein.

A system and method are introduced herein to monitor performance of a communications link between a mobile RBS and a number of BSCs. A processor operating in accordance with a memory executing program code in a master M/C unit operable in a network server is designed to determine an optimal BSC and to provide dynamic configurations to allow improved communications between the RBS and a selected BSC. The processor executes the program code to trigger a change from a serving BSC to the selected BSC, when appropriate.

As an example, the RBS has a default configuration to communicate with a default BSC. As the RBS on-board a vessel sails around the globe, a monitoring system ma determine that the RBS should be communicating with another BSC. Upon such a determination, the RBS is automatically taken out of service, reconfigured to communicate with a new BSC, and brought back into service using the newly selected BSC. In an embodiment, the selected BSC is also automatically configured to communicate with the RBS. The determination of an optimal BSC is performed considering performance parameters or data such as transport round trip time between RBS and BSC, IP packet delay variance between RBS and BSC, IP packet loss between RBS and BSC, current load of BSCs, transport muting costs between RBS and BSC, and transport network load.

Determination of the optimal BSC is realized by having the master M/C unit located in a network server and a slave monitoring function located at each BSC. At specified intervals, the master M/C unit requests RBS performance criteria from the slave monitoring unit at each BSC. Each slave monitoring unit collects performance data for a particular RBS and returns it to the master M/C unit. Once the performance data is collected from all BSCs (or from a slave monitoring unit at each BSC), the master M/C unit assesses the performance data to determine the optimal BSC. When a change in serving BSC is appropriate, the master M/C unit removes the RBS from the current BSC, configures the new selected BSC to serve the RBS in question, configures the RBS to communicate with the newly selected BSC, brings the RBS into service using the newly selected BSC, and informs relevant operational monitoring functions.

Figure 5:
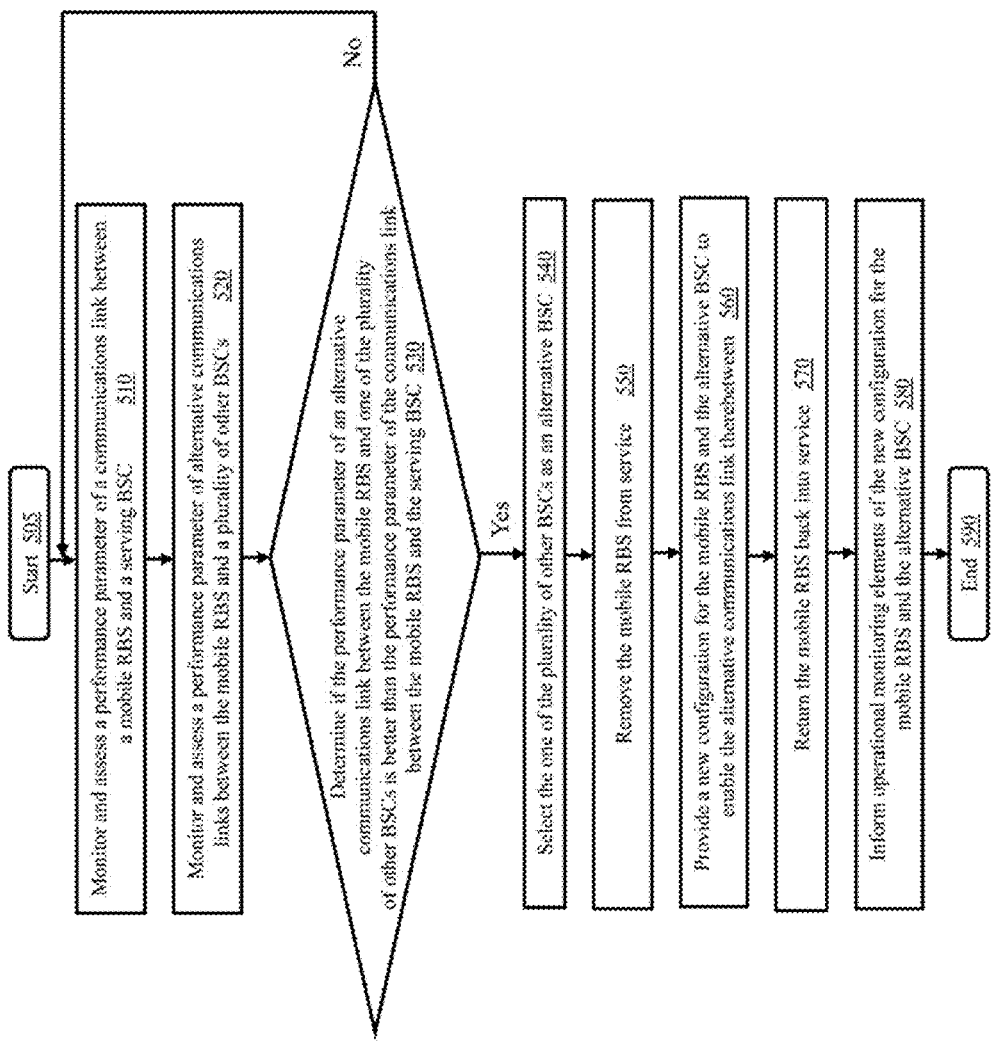
FIGS. 5 to 7 illustrate high-level flow diagrams of embodiments of methods of operating a communication system.

Turning now to FIG. 5, illustrated is a high-level flow diagram of an embodiment of a method of operating a communication system. The method or process is executed at a master M/C unit to select an alternative BSC, to control a RBS and enable operation thereof. The method begins in a start step or module 505. In a step or module 510, the master M/C unit monitors and assesses a performance parameter of a communications link between a mobile RBS and a serving BSC. The master M/C unit may receive the performance parameter of the communications link from a slave monitoring unit in the serving BSC.

In a step or module 520, the master M/C unit monitors and assesses a performance parameter of alternative communications links between the mobile RBS and a plurality of other BSCs. The master M/C unit may periodically request the performance data of the alternative communications links from a slave monitoring unit of the plurality of other BSCs. In a step or module 530, the master M/C unit determines if the performance parameter of an alternative communications link between the mobile RBS and one of the plurality of other BSCs is better than the performance parameter of the communications link between the mobile RBS and the serving BSC. If the master M/C unit determines the performance parameter of an alternative communication link is better than the performance parameter of the communications link between the mobile radio base station and the serving base station controller, then the method proceeds with a step or module 540. If the master M/C unit does not determine the performance parameter of an alternative communication link is better than the performance parameter of the communications link, between the mobile radio base station and the serving base station controller, then the method returns to the step or module 510, and continues to monitor and assess the performance parameter of the communications link between the mobile RBS and the serving BSC.

In the step or module 540, the master M/C unit selects the one of the plurality of other BSCs as an alternative BSC. The alternative BSC may be a hot back-up alternative BSC for the serving BSC, or the alternative BSC may be selected to enable load balancing among the serving BSC and the plurality of other BSCs including the alternative BSC. In a step or module 550, the master M/C unit removes the mobile RBS from service. In a step or module 560, the master M/C unit provides a new configuration for the mobile RBS and the alternative BSC to enable the alternative communications link therebetween. In a step or module 570, the master M/C unit ret s the mobile RBS back into service. In a step or module 580, the master M/C unit informs operational monitoring elements of the new configuration for the mobile RBS and the alternative BSC. The method ends in as step or module 590.

Figure 6:
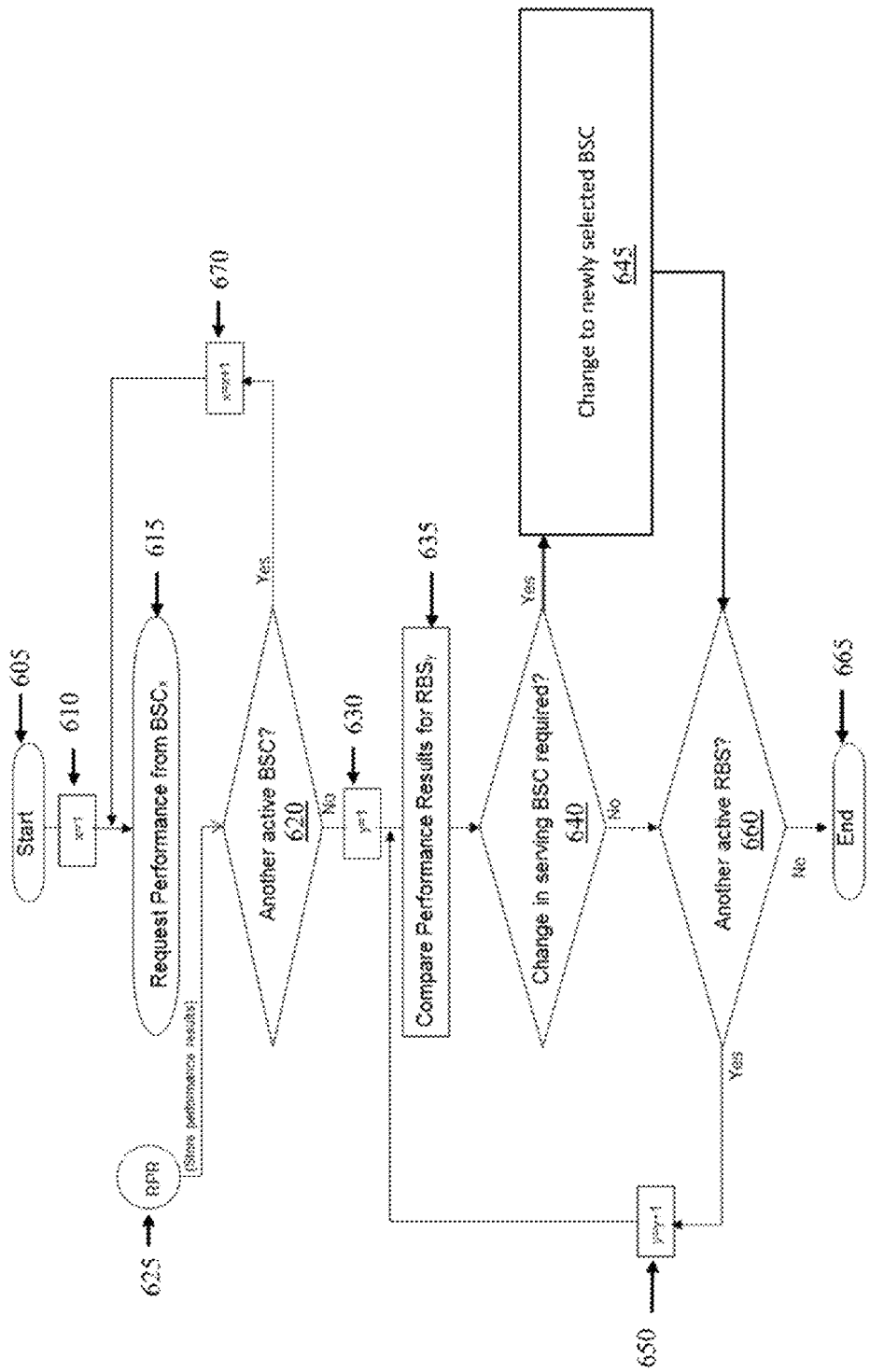

Turning now to FIG. 6, illustrated is a high-level flow diagram of an embodiment of a method of operating a communication system. The method or process is executed at a master M/C unit to select an alternative BSC to control a RBS and enable operation thereof. The method describes how a master M/C unit steps through a group of BSCs identified by an index "x," any of which may be selected to control a particular RBS. The master M/C unit then steps through RBSs identified by an index "y" to compare performance results across the group of RBSs.

The method begins in a start step or module 605. In a step or module 610, the index x is initialized to the value 1. In a step or module 615, the master M/C unit requests performance parameters or data from the BSC identified by the index x, and then proceeds to request performance parameters or data from a slave monitoring unit at the BSCx. After the master M/C unit receives a response 625 from BSCx providing the performance data, the method continues in a step or module 620. In the step or module 620, the master M/C unit determines if there is another active BSC to be interrogated for performance data. If there is another active BSC to be interrogated for performance data, the index x is incremented by "1" in a step or module 670, and the method returns to and continues in the step or module 615, wherein the master M/C unit requests performance data from the next BSC.

If in the step or module 620 there is no further active BSC to be interrogated, the method proceeds with a step or module 630 wherein the index v is initialized to the value 1. The method then proceeds in a step or module 635 wherein performance data results for RBS identified by the index v are compared with performance results of other RBSs. Next, in a step or module 640, the master M/C unit determines if a change in the serving BSC is required. If a change is appropriate, the method proceeds to a step or module 645 to change to a newly selected BSC. In changing to the newly selected BSC, the master M/C unit removes the RBSy from the current BSC, configures the selected BSC to serve the RBSy, and configures the RBSy to communicate with the selected BSC. The master M/C unit also brings the RBS into service using the selected BSC, and informs operational monitoring elements of the altered association of the RBSy with the selected BSC.

The method then proceeds with a step or module 660. In the step or module 660, the master M/C unit determines if there is yet another active RBS for which performance data results should be compared. If there is yet another active RBS for which performance data results should be compared, then the index y is incremented by "1" at a step or module 650, and the process returns to the step or module 635. Otherwise, the method or process ends in a step or module 665.

Figure 7:
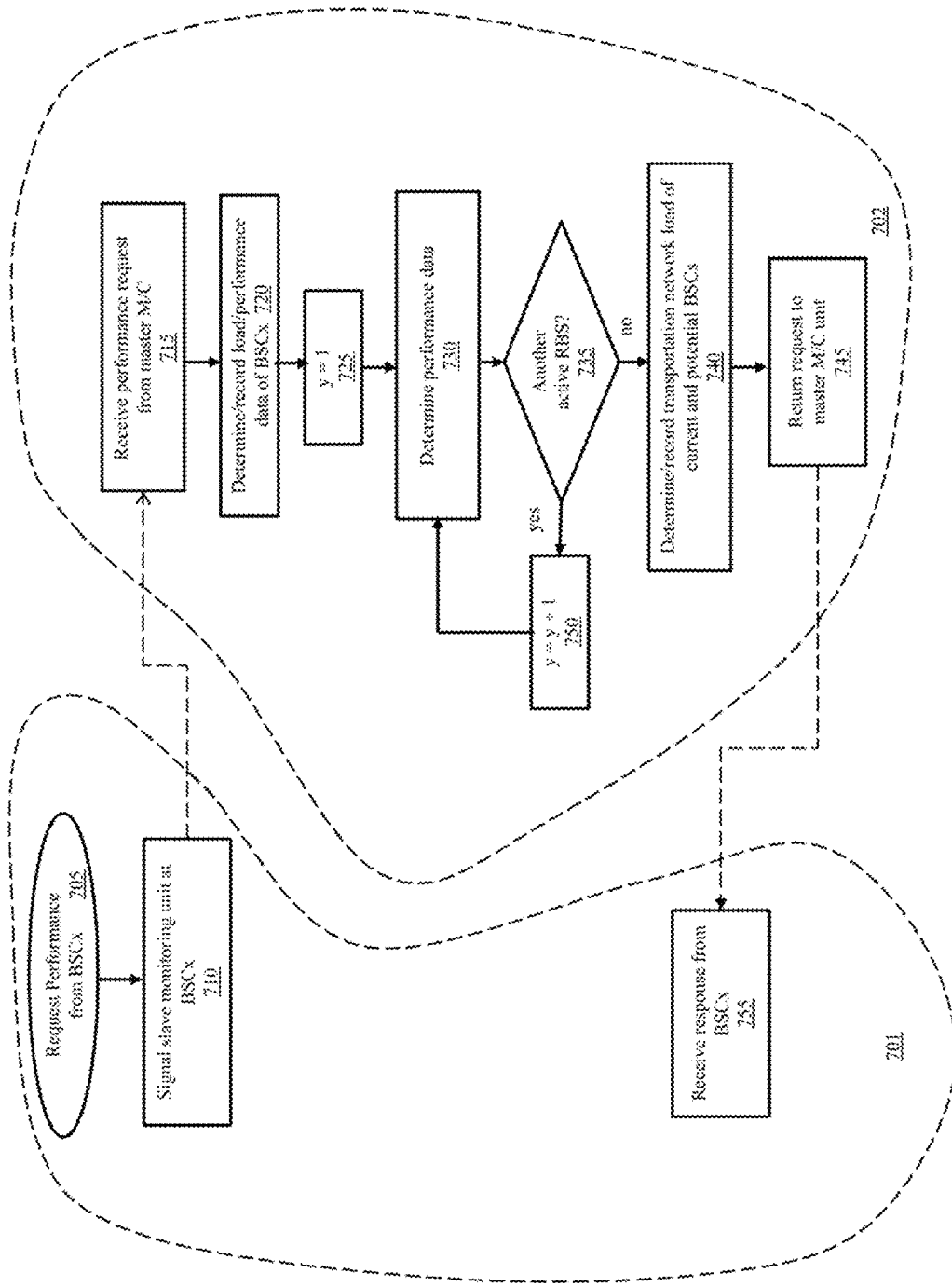

Turning now to FIG. 7 illustrated is a high-level flow diagram of an embodiment of method of operating a communication system. The method or process is executed at a master M/C unit to select an alternative BSC to control a RBS and enable operation thereof. The process 701 executed at the master M/C unit selects an alternative BSC to control a RBS and the process 702 is executed at a BSCx in response to a request from a master M/C unit for performance parameters or data related to an association of the BSCx to various RBSs identified by designator "y." In a step or module 705 (similar to step or module 615 described hereinabove with reference to FIG. 6), the master M/C unit requests performance data from the BSCx. In requesting performance data from the BSCx, in a step or module 710, the master M/C unit signals a slave monitoring unit at the BSCx.

At the BSCx, in a step or module 715, the BSCx receives the request for performance data from the master M/C unit. In a step or module 720, the slave monitoring unit at the BSCx determines and records load and performance data of the BSCx. In a step or module 725, the slave monitoring unit at the BSCx initializes the index y to "1". In a step or module 730, the slave monitoring unit at the BSCx determines performance parameters or data. In accordance therewith, the slave monitoring unit at the BSCx determines and records routing costs between the BSCx to the RBSy, and the round-trip time between the BSCs and the RBSy. The slave monitoring unit at the BSCx also determines and records packet loss data between the BSCx and the RBSy, and jitter and delay variation between the BSCx and the RBSy. The slave monitoring unit at the BSCx also determines and records transport routing costs and load between the BSCx and the RBSy. The method then proceeds to a step or module 735.

In step or module 735 at BSCx, the slave monitoring unit at BSCx determines if there is another active RBS. If there is another active RBS, then in step or module 750, the index y is incremented by 1, and the method returns to step or module 730 for assessment of performance data for RBS(y+1). If, in the step or module 735, it is determined there is no other active RBSs, then the method proceeds to a step or module 740. In the step or module 740, the slave monitoring unit at BSCx determines and records the transportation network load of the current and potential BSCs. In a step or module 745 the slave monitoring unit at the BSCx provides the performance data to the master M/C unit. At the master M/C unit, in a step or module 755, the performance data is received from the BSCx (similar to step or module 625 described hereinabove with reference to FIG. 6). For purposes of completeness, the method may then continue with the step or module 620 illustrated and described hereinabove with reference to FIG. 6.

Thus, as introduced herein, performance for voice, data and M2M device applications is improved by means of choosing an end-to-end transport that is most efficient. Choosing an end-to-end transport that is most efficient accommodates load balancing among BSCs as well as providing BSC redundancy. For example, during a BSC outage or link failure, the RBS can be transferred to an operational BSC. Access is also opened to multiple teleport locations, which in turn provides access to less expensive satellite bandwidth providers.

Program or code segments making up the various embodiments may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), as flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions if matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A master monitor/control (M/C) unit for selecting a base station controller (BSC) to serve a mobile radio base station (RBS), said mobile RBS movable within and among a plurality of geographic regions served by a corresponding plurality of BSCs, comprising:
   a processor; and
   memory including computer program code, said memory and said computer program code configured to, with said processor, cause said master M/C unit to perform at least the following:
      monitor and assess a performance parameter of a communications link between said mobile RBS and a serving BSC;
      monitor and assess a performance parameter of alternative communications links between said mobile RBS and a plurality of other BSCs;
      determine if said performance parameter of an alternative communications link between said mobile RBS and one of said plurality of other BSCs is better than said performance parameter of said communications link between said mobile RBS and said serving BSC;
      select said one of said plurality of other BSCs as an alternative BSC if said performance parameter of said alternative communications link with said mobile RBS is better than said performance parameter of said communications link between said mobile RBS and said serving BSC; and
      provide a new configuration for said mobile RBS and said alternative BSC to enable said alternative communications link therebetween.

2. The master M/C unit as recited in claim 1 wherein said memory and said computer program code are further configured to, with said processor, cause said master M/C unit to:
   remove said mobile RBS from service prior to providing said new configuration for said mobile RBS and said alternative BSC; and
   return said mobile RBS back into service after providing said new configuration for said mobile RBS and said alternative BSC.

3. The master M/C unit as recited in claim 1 wherein said memory and said computer program code are further configured to, with said processor, cause said master M/C unit to inform operational monitoring elements of said new configuration for said mobile RBS and said alternative BSC.

4. The master M/C unit as recited in claim 1 wherein said memory and said computer program code are further configured to, with said processor, cause said master M/C unit to receive said performance parameter of said communications link from a slave monitoring unit in said serving BSC.

5. The master M/C unit as recited in claim 1 wherein said memory and said computer program code are further configured to, with said processor, cause said master M/C unit to periodically request said performance data of said alternative communications links from a slave monitoring unit of said plurality of other BSCs.

6. The master M/C unit as recited in claim 1 wherein said memory and said computer program code are further configured to, with said processor, cause said master M/C unit to monitor and assess said performance parameter of said alternative communications links between said mobile RBS and said plurality of other BSCs to determine a hot back-up alternative BSC for said serving BSC.

7. The master M/C unit as recited in claim 1 wherein said memory and said computer program code are further configured to with said processor, cause said master M/C unit to monitor and assess said performance parameter of said alternative communications links between said mobile RBS and said plurality of other BSCs to enable load balancing, among said serving BSC and said plurality of other BSCs.

8. The master M/C unit as recited in claim 1 wherein said performance parameter of said communications link and said alternative communications links comprises a transport round trip time between said mobile RBS and said serving BSC and said plurality of other BSCs, respectively.

9. The master M/C unit as recited in claim 1 wherein said performance parameter of said communications link and said alternative communications links comprises an Internet protocol (IP) packet delay variance between said mobile RBS and said serving BSC and said plurality of other BSCs, respectively.

10. The master M/C unit as recited in claim 1 wherein said performance parameter of said communications link and said alternative communications links comprises an IP packet loss metric for communications between said mobile RBS and said serving BSC and said plurality of other BSCs, respectively.

11. The master M/C unit as recited in claim 1 wherein said performance parameter of said communications link and said alternative communications links comprises transport routing costs between said mobile RBS and said serving BSC and said plurality of other BSCs, respectively.

12. The master M/C unit as recited in claim 1 wherein said performance parameter of said alternative communications links comprises a current load of said plurality of other BSCs.

13. The master M/C unit as recited in claim 1 wherein said performance parameter of said alternative communications links comprises a transport network load of said plurality of other BSCs.

14. A method in a master monitor/control (M/C) unit for selecting a base station controller (BSC) to serve a mobile radio base station (RBS), said mobile RBS movable within and among a plurality of geographic regions served by a corresponding plurality of BSCs, comprising:

monitoring and assessing a performance parameter of a communications link between said mobile RBS and a serving BSC;

monitoring and assessing a performance parameter of alternative communications links between said mobile RBS and a plurality of other BSCs;

determining if said performance parameter of an alternative communications link between said mobile RBS and one of said plurality of other BSCs is better than said performance parameter of said communications link between said mobile RBS and said serving BSC;

selecting said one of said plurality of other BSCs as an alternative BSC if said performance parameter of said alternative communications link with said mobile RBS is better than said performance parameter of said communications link between said mobile RBS and said serving BSC; and providing a new configuration for said mobile RBS and said alternative BSC to enable said alternative communications link therebetween.

15. The method as recited in claim 14, further comprising:

removing said mobile RBS from service prior to providing said new configuration for said mobile RBS and said alternative BSC; and returning said mobile RBS back into service after providing said new configuration for said mobile RBS and said alternative BSC.

16. The method as recited in claim 14 further comprising informing operational monitoring elements of said new configuration for said mobile RBS and said alternative BSC.

17. The method as recited in claim 14 further comprising receiving said performance parameter of said communications link from a slave monitoring unit in said serving BSC.

18. The method as recited in claim 14 further comprising periodically requesting said performance data of said alternative communications links from a slave monitoring unit of said plurality of other BSCs.

19. The method as recited in claim 14 further comprising monitoring and assessing said performance parameter of said alternative communications links between said mobile RBS and said plurality of other BSCs to determine a hot back-up alternative BSC for said serving BSC.

20. The method as recited in claim 14 further comprising monitoring and assessing said performance parameter of said alternative communications links between said mobile RBS and said plurality of other BSCs to enable load balancing among said serving BSC and said plurality of other BSCs.

21. The method as recited in claim 14 wherein said performance parameter of said communications link and said alternative communications links comprises a transport round trip time between said mobile RBS and said serving BSC and said plurality of other BSCs, respectively.

22. The method as recited in claim 14 wherein said performance parameter of said communications link and said alternative communications links comprises an Internet protocol (IP) packet delay variance between said mobile RBS and said serving BSC and said plurality of other BSCs, respectively.

23. The method as recited in claim 14 wherein said performance parameter of said communications link and said alternative communications links comprises an IP packet loss metric for communications between said mobile RBS and said serving BSC and said plurality of other BSCs, respectively.

24. The method as recited in claim 14 wherein said performance parameter of said communications link and said alternative communications links comprises transport routing costs between said mobile RBS and said serving BSC and said plurality of other BSCs, respectively.

25. The method as recited in claim 14 wherein said performance parameter of said alternative communications links comprises a current load of said plurality of other BSCs.

26. The method as recited in claim 14 wherein said performance parameter of said alternative communications links comprises a transport network load of said plurality of other BSCs.

* * * * *